(12) United States Patent
Green, Sr. et al.

(10) Patent No.: US 6,917,783 B2
(45) Date of Patent: *Jul. 12, 2005

(54) SATELLITE BROADCAST RECEIVING AND DISTRIBUTION SYSTEM

(75) Inventors: James A. Green, Sr., Tallahassee, FL (US); Austin S. Coker, Jr., Tallahassee, FL (US)

(73) Assignee: Global Communications, Inc., Tallahassee, FL (US)

( * ) Notice: Subject to any disclaimer, the term of this patent is extended or adjusted under 35 U.S.C. 154(b) by 366 days.

This patent is subject to a terminal disclaimer.

(21) Appl. No.: 10/016,119

(22) Filed: Dec. 17, 2001

(65) Prior Publication Data

US 2003/0040270 A1 Feb. 27, 2003

Related U.S. Application Data

(63) Continuation of application No. 09/621,464, filed on Jul. 21, 2000, now Pat. No. 6,334,045, and a continuation of application No. 09/001,484, filed on Dec. 31, 1997, now Pat. No. 6,122,482, which is a continuation-in-part of application No. 08/838,677, filed on Apr. 19, 1997, now Pat. No. 5,805,975, which is a continuation-in-part of application No. 08/394,234, filed on Feb. 22, 1995, now abandoned.

(51) Int. Cl.$^7$ .......................... H04B 1/00; H04B 7/185
(52) U.S. Cl. ................. 455/3.02; 455/12.1; 725/63
(58) Field of Search .................. 455/3.02, 3.04, 455/12.1, 20, 22, 427, 428, 179.1, 14; 725/63, 67, 68

(56) References Cited

U.S. PATENT DOCUMENTS

| | | |
|---|---|---|
| 3,324,417 A | 6/1967 | Garner |
| 3,665,316 A | 5/1972 | Jeffers |
| 3,730,980 A | 5/1973 | Kirk, Jr. |
| 3,936,594 A | 2/1976 | Schubin et al. |
| 4,023,104 A | 5/1977 | Rheinfelder |
| 4,066,966 A | 1/1978 | Takeuchi et al. |
| 4,130,801 A | 12/1978 | Prygoff |
| 4,135,202 A | 1/1979 | Cutler |

(Continued)

FOREIGN PATENT DOCUMENTS

| | | |
|---|---|---|
| DE | 3623581 C1 | 4/1988 |
| DE | 41 26 774 | 1/1993 |
| DE | 4334440 | 4/1995 |
| GB | 2119192 A | 11/1983 |
| JP | 2-140022 | 11/1988 |
| JP | 0309032 | 12/1988 |
| JP | 63309032 | 12/1988 |
| JP | 5-344014 A | 12/1993 |

OTHER PUBLICATIONS

Press Release, Heifner Communications Inc. (Oct. 15, 1996).

Heifner Communications, Inc. "Proposal to Incorporate Traditional and L–Band Distribution" (Aug. 11, 1996).

"Bridging the DBS Market," Private Cable Investor, No. 198 (Nov. 30, 1996).

Primary Examiner—Quochien B. Vuong
(74) Attorney, Agent, or Firm—Nixon & Vanderhye P.C.

(57) ABSTRACT

A satellite signal distribution system distributes signal blocks of two different received frequencies and polarities simultaneously over the same cable. The satellite system includes a satellite dish or antenna that receives signals. These received signals are transmitted to a block frequency converter that enables the different frequency polarity blocks to be distributed simultaneously via a single cable. The cable is coupled to a head-out receiver processor which distributes the signals to satellite receivers. The receivers are connected to TVs or other sources. This unique design and configuration provides for a system that will permit satellite broadcast signal distribution to high-rise buildings, hospitals, condominiums, schools, and the like.

32 Claims, 1 Drawing Sheet

U.S. PATENT DOCUMENTS

| | | |
|---|---|---|
| 4,183,054 A | 1/1980 | Patisaul et al. |
| 4,395,734 A | 7/1983 | Rypkema |
| 4,419,768 A | 12/1983 | Yamashita et al. |
| 4,429,418 A | 1/1984 | Hooper |
| 4,439,740 A | 3/1984 | Harrington |
| 4,484,218 A | 11/1984 | Boland et al. |
| 4,486,773 A | 12/1984 | Okubo |
| 4,509,198 A | 4/1985 | Nagatomi |
| 4,512,033 A | 4/1985 | Schrock |
| 4,513,315 A | 4/1985 | Dekker et al. |
| 4,527,136 A | 7/1985 | Kamiya |
| 4,530,008 A | 7/1985 | McVoy |
| 4,532,543 A | 7/1985 | Groenewegen |
| 4,538,174 A | 8/1985 | Gargini et al. |
| 4,538,175 A | 8/1985 | Balbes et al. |
| 4,542,300 A | 9/1985 | Nagatomi |
| 4,545,048 A | 10/1985 | Hauk et al. |
| 4,545,075 A | 10/1985 | Miller et al. |
| 4,556,988 A | 12/1985 | Yoshisato |
| 4,558,358 A | 12/1985 | Onda |
| 4,580,161 A | 4/1986 | Petrus et al. |
| 4,586,081 A | 4/1986 | St. Arnaud et al. |
| 4,592,093 A | 5/1986 | Ouchi et al. |
| 4,605,968 A | 8/1986 | Hayashi |
| 4,608,710 A | 8/1986 | Sugiura |
| 4,648,123 A | 3/1987 | Schrock |
| 4,677,686 A | 6/1987 | Hustig et al. |
| 4,709,418 A | 11/1987 | Fox et al. |
| 4,710,777 A | 12/1987 | Halverson |
| 4,710,972 A | 12/1987 | Hayashi et al. |
| 4,761,825 A | 8/1988 | Ma |
| 4,761,827 A | 8/1988 | Horton et al. |
| 4,866,787 A | 9/1989 | Olesen |
| 4,901,367 A | 2/1990 | Nicholson |
| 4,959,862 A | 9/1990 | Davidov et al. |
| 4,993,066 A | 2/1991 | Jenkins |
| 5,045,823 A | 9/1991 | Nichols, III |
| 5,073,930 A | 12/1991 | Green et al. |
| 5,136,411 A | 8/1992 | Paik et al. |
| 5,181,106 A | 1/1993 | Sutherland |
| 5,204,767 A | 4/1993 | Nakata et al. |
| 5,206,954 A | 4/1993 | Inoue et al. |
| 5,216,432 A | 6/1993 | West |
| 5,221,983 A | 6/1993 | Wagner |
| 5,225,799 A | 7/1993 | West et al. |
| 5,276,904 A | 1/1994 | Mutzig et al. |
| 5,301,352 A | 4/1994 | Nakagawa et al. |
| 5,303,229 A | 4/1994 | Withers et al. |
| 5,303,403 A | 4/1994 | Leong |
| 5,331,332 A | 7/1994 | West et al. |
| 5,345,591 A | 9/1994 | Tsurumaki et al. |
| 5,437,051 A | 7/1995 | Oto |
| 5,440,319 A | 8/1995 | Raymond et al. |
| 5,455,961 A | 10/1995 | Nakagawa |
| 5,457,811 A | 10/1995 | Lemson |
| 5,463,407 A | 10/1995 | West et al. |
| 5,481,542 A | 1/1996 | Logston et al. |
| 5,488,413 A | 1/1996 | Elder et al. |
| 5,488,659 A | 1/1996 | Miliani |
| 5,504,609 A | 4/1996 | Alexander et al. |
| 5,541,757 A | 7/1996 | Fuse et al. |
| 5,572,347 A | 11/1996 | Burton et al. |
| 5,574,964 A | 11/1996 | Hamlin |
| 5,592,540 A | 1/1997 | Beveridge |
| 5,644,368 A | 7/1997 | Natsume |
| 5,657,143 A | 8/1997 | Hajj et al. |
| 5,659,351 A | 8/1997 | Huber |
| 5,666,126 A | 9/1997 | Lange |
| 5,682,426 A | 10/1997 | Miliani et al. |
| 5,737,698 A | 4/1998 | Gabrelian et al. |
| 5,752,180 A * | 5/1998 | Guo et al. ............... 455/3.2 |
| 5,787,335 A | 7/1998 | Novak |
| 5,793,258 A | 8/1998 | Lange |
| 5,805,975 A * | 9/1998 | Green, Sr. et al. |
| 5,812,591 A | 9/1998 | Shumaker et al. |
| 5,812,947 A | 9/1998 | Dent |
| 5,835,128 A | 11/1998 | Macdonald et al. |
| 5,889,498 A | 3/1999 | Lange et al. |
| 5,898,455 A | 4/1999 | Barakat et al. |
| 5,933,123 A | 8/1999 | Kaul |
| D414,187 S | 9/1999 | Lange et al. |
| 5,959,592 A | 9/1999 | Petruzzelli |
| 5,970,386 A | 10/1999 | Williams |
| 5,995,258 A | 11/1999 | Weber et al. |
| 6,104,908 A | 8/2000 | Schaffner et al. |
| 6,122,482 A | 9/2000 | Green, Sr. et al. |
| 6,134,419 A | 10/2000 | Williams |
| 6,334,045 B1 | 12/2001 | Green, Sr. et al. |
| 6,397,038 B1 | 5/2002 | Green, Sr. et al. |
| 6,486,907 B1 | 11/2002 | Farber et al. |

OTHER PUBLICATIONS

"Special Advertising Section, 1997 Buyer's Guide," Private Cable & Wireless Cable, p. A19, A16 (Jan. 1997).

Heifner Communications, Inc., "Private Cable Industry Gets Fiber Optic Solution to DBS Delivery!" (Mar. 13, 1997).

Foxcom Advertisement, "Connect . . . with Fiber" (1997).

"DBS Transport," "Heifner Communications, Inc. in cooperation with World Satellite Network (WSNet), announces the first availability of DBS transport to the Private Cable Market," with DBS Survey (Aug. 11, 1997 fax).

Private Cable & Wireless Cable, vol. 16, No. 9, 3 pages (Sep. 1997).

Moore, Ivan, "Digital Dwelling," Private Cable & Wireless Cable, vol. 16, No. 10 (Oct. 1997).

Allon, Mor, "Delivering the Satellite Goods," and WSNet Advertisement, "It is a small world, after all.," Private Cable & Wireless Cable, vol. 16, No. 11 (Nov. 1997).

"Heifner Communications completes installation of first fiber optic deliverd L–band system in the U.S.," Private Cable Update (Dec. 1997).

MDU Technical Specification, Multi–user Systems Specifications, Revision 1.0 DirectTV (Jan. 20, 1997).

Multi–user Systems Specifications, DSS–MDU Single 1000 Open Specification, Rev. 1.0, Preliminary (Jan. 17, 1997).

Product Review, Satellite Retailer/Aug. (1992).

International Cable, SkyPix, "Changing the way you watch television . . . forever." Specifications, SkyPix 36" Antenna, Lockwood, L.W., "DirecTV—A digital DBS" (Apr. 1993).

Advertisement, CommScope, Inc. Network Cable Division, TVRO Dealer (Sep. 1994).

Hogan, Monica, "If you Can't Beat 'em, Join 'em," Satellite Retailer (May 1995).

USSB Research Findings, Source: Frank N. Magid Associates, "Households with DSS Connected to Stereo Or Surround Sound System, VCR Ownership" (May, 1996).

"DirecTV, Inc. Launches Program to Serve Multiple–Family Dwelling Unit Market" (Aug. 8, 1996).

"The report on the development of the most effective solution yet developed to distribute digital satellite signals in large properties," Presented jointly by; Heifner Communications, Inc., Foxcom, Ltd., Global Communications, Inc. (Mar. 1997).

"Untangling the MDU/DBS Universe," Private Cable Investor (Apr. 30, 1997).

Advertisement, "Don't cut corners on your installation," ChannelPlus, TVRO Dealer (May 1997).

Slater, Heidi, K., "Satellite Showcase, SBCA's Vegas '97 searches to overcome the industry's critical challenges," Private Cable & Wireless Cable, p. 31 (May 1997).

Draty, David, "SDTV" A Cost–Effective Solution for MDUs, The Transponder (May 1997).

"Announcing Heifner Communications' DBS Transport with DirecTV," Private Cable Update (Sep. 1997).

Private Cable & Wireless Cable, "DBS and PCOs: An Evolving Relationship" (Aug. 1996).

Retailer News, Supplement to Triple D Publishing, Inc. Publications Issue 19 (May 6–12, 1996).

Private Cable Investor, No. 179 (Apr. 30, 1995).

Moore, Ivan, "Competition, You are the Gatekeeper and Planning Is The Key" (Nov./Dec. 1995).

"DirecTV, Inc. Launches MDU Program," Retailer News (Sep. 2–8, 1996).

WSNet Annual Shareholder Report For the Fiscal Year Ended Aug. 31, 1997.

Heifner Communications Oct. 18, 1996 fax to Global Communications.

Global Communications, Inc. "News.Flash, DBS Digi–S–MATV™ Clearly the Best Value in Mini–Cable Systems" (1996).

Global Communications, Inc. ".Announcing, DBS Digi–S–MATV™ Clearly the Best Value in Mini–Cable SYstems" (1996).

Cooper Jr., Robert B., "Home Reception via Satellite," Radio Electronics.

Cooper Jr., Robert B., "Low Cost Backyard Satellite TV Earth Station," Build This.

Cooper Jr., Robert B., "Home Reception Using Backyard Satellite TV Receivers," Technology Today.

Cooper Jr., Robert B., "Backyard Satellite TV Receiver," Build This.

Cooper Jr., Robert B., "Backyard Satellite TV Receiver, Conclusion" Build This.

Global Communications, Inc. Apr. 19, 1995 letter to Eddy Hartenstein.

Nov. 11, 1996 letter (with attachment).

Dec. 10, 1996 letter (with attachment).

RCN Oct. 4, 1996 letter (with attachment).

Jun. 12, 1996 letter from Coker to Williams.

May 24, 1996 letter (with attachments) from Williams to Coker.

Mussino, Franco, Verified translation of "The Reception of Direct Broadcast Satellite TV Signals in the 12 GHz Band, Using the 'C–Mac Packet System'," Electronics and Telecommunications No. 3 (1984).

Baylin, "Digital Satellite TV" (5th Ed. 1997), pp. 92–93 and 159–163.

U.S. Provisional Appl. No. 60/068.589, filed Dec. 23, 1997.

"Private Cable Update" Dec. 1997.

Shrader, Robert L., *Electronic Communication*, Fifth Edition, p. 398.

Konishi, et al., "Satellite Broadcasting," 89 *SMPTE Journal*, No. 3, pp. 162–166 (Mar. 1980), First Printed Dec. 1978.

Grant, "Direct Broadcast from Lower Power Satellites," 81 *Proceedings of the IEEE International Conf. on Comm.*, pp. 26.1.1–16.1.5, (Jun. 1981).

Cooper, "How to Build a Satellite TV Receiver," *Radio Electronics* (1981).

Douville, "A 12–GHZ Low–Cost Earth Terminal for Direct TV Reception from Broadcast Satellites," *IEEE Proceedings on Consumer Electronics* (1977).

Jurgen, "Chasing Japan in the HDTV Race," 26 *IEEE Spectrum*, No. 10, pp. 26–30 (Oct. 1989).

Tannas Jr., "HDTV Displays in Japan: Projection–CRT Systems on Top," *IEEE Spectrum*, 0018–9235/89/1000–0031, pp. 31–33 (Oct. 1989).

Dinsel, "Die Verteilung von Fernseh–Satelliten–Signalen in Kabelnetzen," *Fernseh–Unh Kino–Technik*, vol. 39, No. 1, Berlin, Germany, (Jan. 1985).

Brücke zum Kunden, Neue UKW–Kanalumsetzer übertragen viele Programme in bester Stereo–Qualität für grosse Germeinschafts–Antennenanlagen, Eckar Germany (1973).

Mussino, "Reception and Distribution Techniques for DBS Signals in Comunity Antenna Installations," *Alta Frequenza*, vol. 55, No. 2, Milano Italy (Apr. 1986).

"Broadband Communication Agile Processor 362HL," cadco Inc., 1990 Catalog, 6 pages.

White Papers, "SDTV Satellite Distribution Television System for Multiple Dweeling Units," www.foxcom.com, 6 pages (©1997–1999).

Foxcom, "About Us," 2 pages (©1997–1999).

Baylin, Frank, et al., *World Satellite TV and Scrambling Methods*, third edition, 1993, Baylin Publications, Boulder, CO, pp. 7–14.

\* cited by examiner

SATELLITE BROADCAST RECEIVING AND DISTRIBUTION SYSTEM

This continuing application claims priority under 35 USC Section 120 from each of the following prior applications:

application Ser. No. 09/621,464, filed Jul. 21, 2000, now U.S. Pat. No. 6,334,045;

and a continuation of application Ser. No. 09/001,484, filed Dec. 31, 1997, now U.S. Pat. No. 6,122,482;

which is a continuation-in-part of application Ser. No. 08/838,677, filed Apr. 9, 1997, now U.S. Pat. No. 5,805,975;

which is a continuation-in-part of application Ser. No. 08/394,234, filed Feb. 22, 1995, now abandoned.

BACKGROUND OF THE INVENTION

1. Field of the Invention

The present invention relates generally to a satellite broadcasting receiving and distribution system, and more particularly to a broadcasting receiving and distribution system that will allow for the transmission of vertical and horizontal (or left-hand circular and right-hand circular) polarization signals simultaneously via a single coaxial cable.

2. Description of the Prior Art

Satellite broadcasting has become very popular throughout the United States. Conventionally, broadcast signals are transmitted through an artificial satellite at very high frequencies. These frequencies are generally amplified and are processed by a satellite receiving arrangement after being received by an antenna or antennas, and prior to application to a conventional home television set or the like.

The satellite receiving arrangement is generally composed of an outdoor unit generally associated with the antenna and an indoor unit generally associated with the television set or the like. The outdoor and indoor units are coupled via a coaxial cable.

As an example, U.S. Pat. No. 5,301,352 issued to Nakagawa et al. discloses a satellite broadcast receiving system. The system of Nakagawa et al. includes a plurality of antennas which, respectively, include a plurality of output terminals. A change-over divider is connected to the plurality of antennas and has a plurality of output terminals. A plurality of receivers are attached to the change-over divider for selecting one of the antennas. Though this system does achieve one of its objects by providing for a simplified satellite system, it does, however, suffer a major shortcoming. This system is silent as to any means of simultaneously transmitting vertical and horizontal polarized signals via a single coaxial cable.

U.S. Pat. No. 5,206,954, issued to Inoue et al. discloses yet another satellite system that includes an outdoor unit that is connected to a channel selector. In this embodiment, the satellite signal receiving apparatus receives vertically and horizontally polarized radiation signals at the site of a receiving antenna. The signals are then transmitted, selectively to provide for either one of the vertically or horizontally polarized signals to be transmitted. This design and configuration provides for one coaxial cable to be utilized, but does not provide for the vertical and horizontal signals to be transmitted simultaneously, but rather, selectively.

None of these previous efforts, however, provide the benefits intended with the present invention. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The illustrative embodiment of the present invention provides a satellite broadcast receiving and distribution system that will permit for the transmission of vertical and horizontal (or left-hand circular and right-hand circular) polarization signals simultaneously via a single coaxial cable. The system will accommodate two different polarity commands from two or more different sources at the same time. This exemplary satellite broadcast receiving and distribution system will provide for the signals received from the satellite to be converted to frequencies which the line amplifiers can transport. This will permit the signals to travel via existing wiring in buildings, high-rises, hospitals, and the like so that satellite broadcasting can be viewed by numerous individuals by way of a single satellite antenna.

The exemplary satellite broadcast system consists of a satellite antenna which receives the polarized signals. These polarized signals are transmitted to a head-in processor and are converted to different frequencies in order to render the different signals to be transmitted simultaneously. Hence, the head-in processor will permit for the transmission of signals of two different frequencies and polarities to be transmitted simultaneously, and will also accommodate two different polarity commands from two or more different television receivers at the same time via a single cable. This cable is coupled to a head-out processor. These signals, once in the head-out processor, will be converted to frequencies that are required for the source (i.e. television). Once converted, the signals are transmitted to a satellite receiver. This satellite receiver is coupled to the source.

Accordingly, it is the object of the present invention to provide for a satellite broadcast receiving and distribution system that will convert different frequencies and different polarized signals in order to permit the signals to be transmitted via a single cable.

It is another object of the present invention to provide for a satellite broadcast receiving and distribution system that will provide service to mid/high-rise office buildings, condominiums, schools, hospitals and the like via a single cable.

A further object of the present invention, to be specifically enumerated herein, is to provide a satellite broadcast receiving and distribution system in accordance with the preceding objects and which will conform to conventional forms of manufacture, be of simple construction and easy to use so as to provide a system that would be economically feasible, long lasting and relatively trouble free in operation.

The present invention meets the requirements of the simplified design, compact size, low initial cost, low operating cost, ease of installation and maintainability, and minimal amount of training to successfully employ the invention.

An example embodiment of the present invention provides a satellite broadcasting system comprising a satellite dish coupled to a low-noise block converter. The low-noise block converter is coupled to a first means of converting vertical polarization signals and horizontal polarization signals (or left-hand circular polarization signals and right-hand circular polarization signals) from a satellite, and transmitting both polarity signals simultaneously via a single coaxial cable. This enables two different frequencies and polarities to be transmitted simultaneously via a single coaxial cable.

The example embodiment further includes a second means coupled to the first means. The second means converts the vertical polarization signals and the horizontal polarization signals (or said left-hand circular polarization signals and the right-hand circular polarization signals) from the first means to frequencies for a source. A satellite receiver is coupled to the second means. The source is coupled to the satellite receiver.

The example embodiment further includes a power source coupled to the first means. The power source powers the first means.

In accordance with a further aspect of the preferred embodiment, the second means provides for the signals to be converted separately and independently to the satellite receiver by a transmitting means. The present invention in one of its aspects further provides a transmitting means for the signals to be selectively converted to the satellite receiver via a first cable coupled to the second means.

In accordance with a further aspect of the invention, the transmitting means further includes a polarity switch for permitting the signals to be selectively converted to the satellite receiver.

In accordance with a still further aspect of the invention, the first means includes a first converting system for converting the signals of a first direction to a desired first frequency and polarization, and a second converting system for converting the signals of a second direction to a desired second frequency and polarization. The first converting system may include a first down converter which is coupled to an amplifier. The second converting system may include an up converter coupled to a second down converter. A joining means may be coupled to the amplifier and the second down converter. The joining means may include a four way splitter. A phase lock loop transmitter may be coupled to the four way splitter.

In accordance with a further aspect of the invention, the second means includes a splitting means to split and divide the signals from the single coaxial cable to enable the signals to be transmitted to a first converting system and a second converting system. The first converting system may convert the signals of a first direction to a desired first frequency and polarization for the satellite receiver. The second converting system may convert the signals of a second direction to a desired second frequency and polarization for the satellite receiver. The first converting system may include a first up converter which is coupled to a splitting means and a first down converter which is coupled to a first down converter. The first down converter may be coupled to the satellite receiver via a first line. The second converting system may include a second up converter coupled to the splitting means. The second up converter may be coupled to the satellite receiver via a second line. The splitting means may include a four way splitter. A phase lock loop may be coupled to the four way splitter.

In accordance with a further aspect of the invention, a first converting system includes a first up converter which is coupled to a splitting means and to a first down converter. The first down converter may be coupled to a joining means. The second converting system may include a second up converter coupled to the splitting means and to the joining means. A polarity switch may be coupled to the first down converter and the second up converter. The polarity switch may be coupled to a first cable which is coupled to the satellite receiver.

In accordance with a further aspect of the invention, the splitting means and the joining means each include a four way splitter, and a phase lock loop receiver is coupled to the spitting means. The splitting means may split and divide signals from the single coaxial cable to enable said signal to be transmitted to a third converting system for converting the signals of said first direction and a fourth converting system for converting the signals of the second direction.

The third converting system includes a second up converter which is coupled to the splitting means and to a third down converter. The third down converter may be coupled to the satellite receiver via a first conduit. The fourth converting system may include a third up converter coupled to the splitting means. The third up converter is also coupled to the satellite receiver via a second conduit.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments, in addition to the scope of the invention defined by the claims taken in conjunction with the accompanying drawings.

DESCRIPTION OF THE PREFERRED EMBODIMENTS

Figure 1:
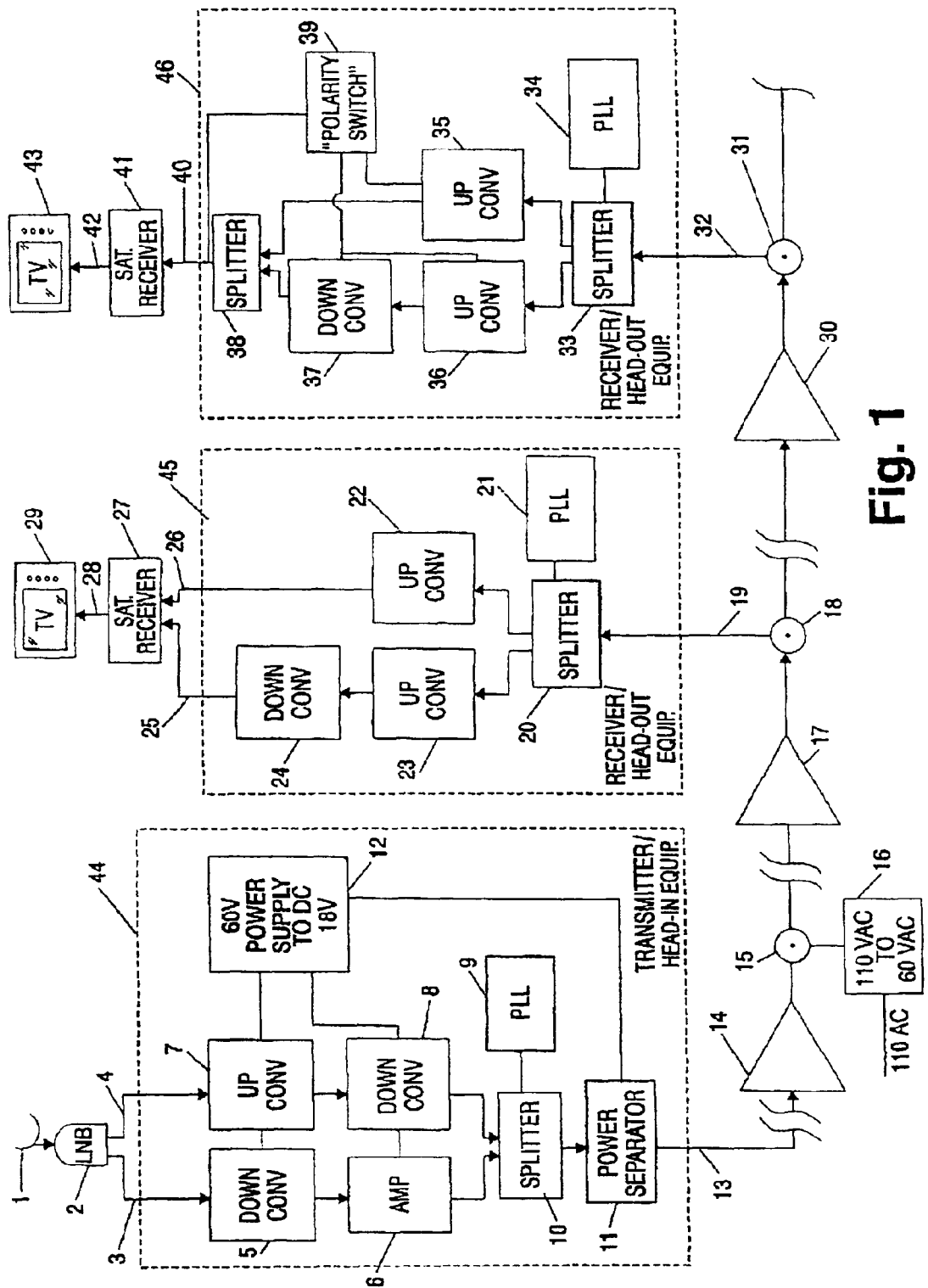
FIG. 1 illustrates a block diagram representing the satellite broadcast signal receiving and distribution system according to a preferred non-limiting exemplary embodiment of the present invention.

As illustrated in FIG. 1, the satellite system of a non-limiting preferred example embodiment of the present invention includes a receiving satellite antenna 1 that is connected to a head-in equipment frequency processor 44. It is at this head-in equipment frequency processor 44 where the signals (Vertical-polarized signals and Horizontal-polarized signals; or left-hand circular and right-hand circular polarization signals) are received simultaneously and then transmitted via a single coaxial cable 13 to the head-out receiver processor 45 or 46. From the receiver processor 45 or 46, the signals are transported to a satellite receiver 27 or 41 and to a source 29 or 43 (this figure illustrates a television as its source).

As illustrated, the receiving satellite antenna 1 is connected to a low-noise block converter (LNB) 2 for amplifying and converting the respective polarized signals (Vertical-polarized signals and Horizontal-polarized signals; or left-hand circular and right-hand circular polarization signals). This LNB converter 2 is coupled to the head-in equipment frequency processor 44. Accordingly, after signals are received, they pass the low-noise block converter 2, to provide for the signals to enter the head-in equipment frequency processor 44 (illustrated in dashed lines) via lines 3 and 4.

The head-in equipment frequency processor 44 provides for the signals via lines 3 and 4 to be converted to the frequencies which the line amplifiers can transport via converters 5 and 7, respectively. From the lines 3 and 4, the signals or transponders are transmitted to a first converter or down converter 5 and a second converter or up converter 7, respectively. These frequency converters convert the entered frequencies to frequencies which the line amplifiers can transport.

The utilization of two converters permits for the acceptance of two signals or polarized transponders that are of a different frequency.

In the down converter 5, the transponders are converted down to a specified frequency. This specified frequency is the frequency that is required for the line amplifiers to transport. The newly converted frequencies are amplified through the amplifying means 6. At means 6, the converted frequencies are amplified so as not to create second harmonics. These signals are then transferred to a four way splitter 10.

In the up converter 7, the transponders are converted up to a specified frequency. The converted frequencies then are converted down via down converter 8. This process of converting up and then down provides for frequencies to be converted without difficulties and avoiding any forbidden conversion area.

The converted signals are transferred to the four way splitter 10 in order to combine the frequency output of the amplified signal of amplifier 6 and the frequency output from converter 8. To synchronize the system, the frequencies from the phase lock loop (PLL) 9 are transmitted to the splitter 10.

From splitter 10, the signals are passed through an A.C. power separator 11. Block 12 routes 60 Volts power to a D.C. power supply of 18 Volts.

This will permit for the dual polarization frequency blocks from the satellite dish 1 to be transmitted simultaneously via a single coaxial cable 13. Dependent upon the length of the cable, an optional amplifier 14 can be coupled thereto. Power from a power source 16 is inserted into the lines via a power inserter 15. The signals are amplified, as needed, with an additional amplifier(s) 17. It is noted that the amplifiers are optional and are dependent to the distance that the head-in frequency processor 44 is located from the head-out receiver processor 45 or 46. The power supply and power source 12 energizes the head-in frequency processor 44.

From the single coaxial cable 13, the signals are adjusted via a tap 18 or 31 to permit for the appropriate power level (decibels) that is required for the head-out receiver processor 45 or 46.

The head-out frequency processor 45 can take the form of a plurality of embodiments. The design and configuration of the head-out frequency processor 45 is dependent on the source (e.g., TV 29) in combination with the satellite receiver 27.

The first embodiment for the head-out receiver processor is illustrated in FIG. 1 and is represented by way of dashed lines 45. As seen in this head-out receiver processor 45, the simultaneously transmitted signals enter the processor 45 via line 19. The line 19 is coupled to a four (4) way splitter 20. A phase locked loop (PLL) receiver 21 is coupled to the splitter 20 to permit for the signals to be locked to the proper and desired frequencies. From the splitter, the first frequency is transmitted to a first converter 22 in order to permit signals or transponders to be converted up to a specified frequency. This up converted signal is then transmitted to the satellite receiver 27 by way of a line 26.

The second frequencies are transmitted to a first or up converter 23 and then is transmitted to a second or down converter 24. This will permit for the signals to be converted to the desired frequency. The conversion of the signals from up to down provides the benefit of converting the frequencies without any mishap or error. This method of conversion will avoid the forbidden conversion area. This second or down converter 24 is coupled to the satellite receiver 27 via line 25. The signals received from the satellite 1 can then be transmitted to the TV (source) 29 by line 28.

As illustrated, this head-out receiver processor 45 is the reverse process of the head-in processor 44. This is to provide for the signals to reconvert to their original frequencies so as to provide for the satellite receiver and TV (source) to accept the signals. The single cable 13 accepts the signals at frequencies different than that of the TV (source) 29 and satellite receiver 27. Accordingly the head-out receiver processor 45 must reconvert the signals to the frequencies that are utilized by the TV (source) 29 and satellite receiver 27. This design and configuration of the head-out receiver processor is dependent on the design and configuration of the satellite receiver 27.

An alteration of the satellite receiver 27 requires an alteration in the head-out receiver processor. This alteration is illustrated in FIG. 1 and is shown in outline and designated as reference 46. In this design and configuration, the satellite receiver 41 utilizes only one wire 40 and accepts only one type of signals at a time, such as left-hand circular polarized signals or right-hand circular polarized signals.

As seen, the frequencies are tapped via 31. The tap 31 is coupled to the head-out receiver processor 46 via line 32 which is connected to a four (4) way splitter 33. To provide for the signals to be locked in proper frequencies, the four way splitter 33 is coupled to a phase locked loop (PLL) receiver 34.

From the splitter 33, the first signal is transmitted to a first or up converter 36, and then is transmitted to a second or down converter 37. The conversion of the signals from up to down provides the benefit of converting the frequencies without any mishap or error. This method of conversion will avoid the forbidden conversion area.

The signals from the splitter 33 are transmitted to an up converter 35 which will inherently convert the signals.

A polarity switch 39 is connected to converters 35, 36, 37 in order to permit for the head-out receiver processor to be coupled to the satellite receiver 41 via a single cable 40 and a joining means 38 which is a four (4) way splitter. The satellite receiver 41 is connected by way of line 42 to a TV (source) 43.

It is noted that FIG. 1 illustrates the use of two head-out receiver processors, but in actuality, only one head-out receiver processor need be utilized with the head-in processor 44. The type and embodiment for the head-out receiver processor is dependent on the combination of the satellite receiver and TV (source) that are utilized.

The satellite system of the present invention will permit for two signals of different frequency and derived from different polarities to travel simultaneously via a single coaxial cable. The use of this satellite system will provide for a satellite system that is versatile, economical, and compact. The usage of the single cable permits for a system that can accept satellite broadcasting in places that were previously rendered impossible. These places includes mid/high-rise office buildings, condominiums, hospitals, schools, etc. The unique design and configuration enables the signals to be transmitted via the existing wiring of the buildings. The only renovations that may need to be done is the upgrading of the existing amplifiers.

While the invention has been particularly shown and described with reference to an embodiment thereof, it will be understood by those skilled in the art that various changes in form and detail may be made without departing from the spirit and scope of the invention.

We claim:

1. A satellite broadcasting system comprising:
    a satellite dish antenna receiving vertical and horizontal polarization signal blocks from at least one satellite;
    a block frequency converter coupled to receive the received signal blocks, the block frequency converter frequency-converting the vertical polarization and horizontal polarization signal blocks received from said satellite to different frequency blocks;
    an amplifier arrangement coupled to said block frequency converter, said amplifier arrangement amplifying said converted signal blocks and applying said signal blocks simultaneously to a single coaxial cable for enabling said two different blocks to be distributed simultaneously via said single coaxial cable; and
    a signal joiner coupled to said amplifier, said signal joiner including a four-way splitter.

2. A satellite broadcasting system as in claim 1 further comprising a satellite receiver coupled to the cable.

3. A satellite broadcasting system as in claim 2 further including a power source coupled to said block frequency converter.

4. A satellite broadcasting system as in claim 2 wherein said block frequency converter provides for said signals to be converted separately and independently by said satellite receiver.

5. A satellite broadcasting system as in claim 4 wherein said block frequency converter includes a first converting means for converting said signals of a first polarization direction to a desired first frequency block and a second converting means for converting said signals of a second polarization direction to a desired second frequency block.

6. A satellite broadcasting system as in claim 5 wherein said first converting means includes a first down converter which is coupled to an amplifier and said second converting means includes an up converter coupled to a second down converter and said joining means is coupled to said amplifier and said second down converting means.

7. A satellite broadcasting system as in claim 6 further including a further splitter to split and divide said signals from said single coaxial cable to enable said signal to be transmitted to a third converting means for converting said signals of said first polarization direction and a fourth converting means for converting said signals of said second polarization direction.

8. A satellite broadcasting system as in claim 7 wherein said third converting means includes a second up converter which is coupled to said splitter and said second up converter is coupled to a third down converter, said third down converter is coupled to said satellite receiver via a first line, said fourth converting system includes a third up converter coupled to said splitter, and said third up converter is coupled to said satellite receiver via a second line.

9. A satellite broadcasting system as in claim 6 wherein said splitter splits and divides said signals to enable said signals to be transmitted to a third converting means for converting said signals of said first direction to a desired first frequency block for said satellite receiver and a fourth converting means for converting said signals of said second polarization direction to a desired second frequency block for said satellite receiver.

10. A satellite broadcasting system as in claim 9 wherein said third converting means includes a second up converter which is coupled to said splitter and said second up converter is coupled to a third down converter, said third down converter is coupled to a second joining means, said fourth converting means includes a third up converter coupled to said splitter, and said third up converter is coupled to said second joining means, a switch is coupled to said third down converter and said third up converter, and said switch is further coupled to a line which is coupled to said satellite receiver, and said second joining means is coupled to said line.

11. A satellite broadcasting system as in claim 4 wherein said splitter splits and divides said signals from said single coaxial cable to enable said signals to be transmitted to a first converting means for converting said signals of a first polarization direction to a desired first frequency for said satellite receiver and a second converting means for converting said signals of a second polarization direction to a desired second frequency for said satellite receiver.

12. A satellite broadcasting system as in claim 11 wherein said first converting means includes a first up converter which is coupled to said splitter and a first down converter is coupled to said first up converter, said first down converter being coupled to said satellite receiver via a first signal line, said second converting means including a second up converter coupled to said splitter, and said second up converter is coupled to said satellite receiver via a second conduit.

13. A satellite broadcasting system as in claim 2 wherein said block frequency converter allows said signals to be selectively converted to said satellite receiver.

14. A satellite broadcasting system as in claim 13 further including a switch for selecting between said blocks to be selectively converted by said satellite receiver.

15. A satellite broadcasting system comprising:
    a satellite dish antenna receiving vertical and horizontal polarization signal blocks from at least one satellite;
    a block frequency converter coupled to receive the received signal blocks, the block frequency converter frequency-converting the vertical polarization and horizontal polarization signal blocks received from said satellite to different frequency blocks; and
    an amplifier arrangement coupled to said block frequency converter, said amplifier arrangement amplifying said converted signal blocks and applying said signal blocks simultaneously to a single coaxial cable for enabling said two different blocks to be distributed simultaneously via said signal coaxial cable;
    further comprising a satellite receiver coupled to the cable;
    wherein said block frequency converter provides for said signals to be converted separately and independently by said satellite receiver;
    wherein said block frequency converter includes a first converting means for converting said signals of a first polarization direction to a desired first frequency block and a second converting means br converting said signals of a second polarization direction to a desired second frequency block;
    wherein said first converting means includes a first down converter which is coupled to an amplifier and said second converting means includes an up converter coupled to a second down converter and a joining means is coupled to said amplifier and said second down converting means;

wherein said joining means includes a four way splitter.

16. A satellite broadcasting system as in claim 15 wherein a phase lock loop is coupled to said four way splitter.

17. A satellite broadcasting system comprising:

a satellite dish antenna receiving vertical and horizontal polarization signal blocks from at least one satellite;

a block frequency converter coupled to receive the received signal blocks, the block frequency converter frequency-converting the vertical polarization and horizontal polarization signal blocks received from said satellite to different frequency blocks; and an amplifier alignment coupled to said block frequency converter, said amplifier arrangement amplifying said converted signal blocks and applying said signal blocks simultaneously to a single coaxial cable for enabling said two different blocks to be distributed simultaneously via said single coaxial cable;

further comprising a satellite receiver coupled to the cable;

wherein said block frequency converter provides for said signals to be converted separately and independently by said satellite receiver;

further including a splitter to split and divide said signals from said single coaxial cable to enable said signals to be transmitted to a first converting means for converting said signals of a first polarization direction to a desired first frequency for said satellite receiver and a second converting means for converting said signals of a second polarization direction to a desired second frequency for said satellite receiver;

wherein said first converting means includes a first up converter which is coupled to said splitter and a first down converter is coupled to said first up converter, said first down converter being coupled to said satellite receiver via a first signal line, said second converting means including a second up converter coupled to said splitter, and said second up converter is coupled to said satellite receiver via a second conduit;

wherein said splitter includes a four way splitter.

18. A satellite broadcasting system as in claim 17 wherein a phase lock loop is coupled said tour way splitter.

19. A satellite broadcasting system comprising:

a satellite dish antenna receiving vertical and horizontal polarization signal blocks from at least one satellite;

a block frequency converter coupled to receive the received signal blocks, the block frequency converter frequency-converting the vertical polarization and horizontal polarization signal blocks received from said satellite to different frequency blocks; and an amplifier arrangement coupled to said block frequency converter, said amplifier arrangement amplifying said converted signal blocks and applying said signal blocks simultaneously to a single coaxial cable for enabling said two different blocks to be distributed simultaneously via said single coaxial cable;

further comprising a satellite receiver coupled to the cable wherein said block frequency converter allows said signals to be selectively converted to said satellite receiver;

further including a switch for selecting between said blocks to be selectively converted by said satellite receiver;

further including a splitter to split and divide said signals from said single coaxial cable to enable said signal to be transmitted to a first block converting means for converting said signals of a first polarization direction to a desired first frequency block for said satellite receiver and a second block converting means for converting said signals of a second polarization direction to a desired second frequency block for said satellite receiver;

wherein said first converting means includes a first up converter which is coupled to said splitter and said first up converter is coupled to a first down converter, said first down converter is coupled to a joining means, said second converting means includes a second up converter coupled to said splitter, and said second up converter is coupled to said joining means, a switch is coupled to said first down converter and said second up converter, and said switch is coupled to said satellite receiver;

wherein said splitter and said joining means each include a four way splitter, and a phase lock loop is coupled to said splitter.

20. A satellite signal distribution system that distributes at least one vertical polarization type block of received satellite signals and at least one horizontal polarization type block of received satellite signals over the same distribution cable to at least one remotely located satellite receive, said distribution system comprising:

a block converter connected to frequency-convert to a different frequency block, at least one of (a) said vertical polarization type block of received satellite signals and (b) said horizontal polarization type block of received satellite signals, said block converter having an output;

at least one amplifier arrangement coupled to the block converter output, said amplifier arrangement amplifying said frequency-converted block(s); and a coupling arrangement that couples said vertical polarization type block of received satellite signals and said horizontal polarization type block of received satellite signals as block frequency converted and amplified by said block converter and said amplifier, such that said vertical polarization type block of satellite signals and said horizontal polarization type block of satellite signals are carried simultaneously by said same distribution cable to least one remotely located satellite receiver, said coupling arrangement including a four-way splitter.

21. The system of claim 20 wherein each of plural satellite receivers are coupled to said splitter, said plural satellite receivers, in use, each independently selecting a desired satellite signal within either said vertical polarization type block of satellite signals and said horizontal polarization type block of satellite signals carried by said distribution cable.

22. The system of claim 21 wherein said distribution cable comprises a coaxial cable.

23. The system of claim 21 wherein said amplifier arrangement amplifies so as not to create second harmonics.

24. The system of claim 21 wherein said block converter converts transponders of said received satellite signals-up to a specified frequency.

25. The system of claim 24 wherein said block converter converts signals to a higher frequency block and then to a lower frequency block to avoid any hidden or forbidden conversion areas.

26. The system of claim 20 wherein said block converter frequency-converts both said vertical polarization type block of received satellite signals and said horizontal polarization type block of received satellite signals.

27. The system of claim 20 wherein said block converter comprises a down converter.

28. The system of claim 20 wherein said block converter includes an up converter connected to a down converter.

29. The system of claim 20 wherein said block converter includes a phase locked loop.

30. The system of claim 20 further including a satellite antenna.

31. The system of claim 30 wherein said block converter is connected between said satellite antenna and said amplifier.

32. The system of claim 20 further including an AC power separator.

* * * * *